United States Patent
Pani et al.

(10) Patent No.: US 9,119,207 B2
(45) Date of Patent: Aug. 25, 2015

(54) METHOD AND APPARATUS FOR GENERATING A RADIO LINK CONTROL PROTOCOL DATA UNIT FOR MULTI-CARRIER OPERATION

(71) Applicant: InterDigital Patent Holdings, Inc., Wilmington, DE (US)

(72) Inventors: Diana Pani, Montreal (CA); Paul Marinier, Brossard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/301,006

(22) Filed: Jun. 10, 2014

(65) Prior Publication Data

US 2014/0293812 A1 Oct. 2, 2014

Related U.S. Application Data

(63) Continuation of application No. 12/765,310, filed on Apr. 22, 2010.

(60) Provisional application No. 61/172,499, filed on Apr. 24, 2009.

(51) Int. Cl.
*H04J 3/00* (2006.01)
*H04W 72/04* (2009.01)
(Continued)

(52) U.S. Cl.
CPC .......... *H04W 72/0453* (2013.01); *H04W 28/06* (2013.01); *H04L 5/003* (2013.01); *H04W 72/02* (2013.01); *H04W 88/02* (2013.01)

(58) Field of Classification Search
None
See application file for complete search history.

(56) References Cited

U.S. PATENT DOCUMENTS

2006/0072494 A1 4/2006 Matusz
2006/0268884 A1 11/2006 Terry et al.
(Continued)

FOREIGN PATENT DOCUMENTS

CN 101189809 A 5/2008
CN 101222415 A 7/2008
(Continued)

OTHER PUBLICATIONS

3rd Generation Partnership Project (3GPP), R2-092156, "DC-HSUPA impact on RAN2 specifications", Qualcomm Europe, 3GPP TSG RAN WG2 #65bis, Mar. 23-27, 2009, 1-9.
(Continued)

*Primary Examiner* — Mohammad Adhami
(74) *Attorney, Agent, or Firm* — Condo Roccia Koptiw LLP

(57) ABSTRACT

Techniques and apparatus for efficiently determining the radio link control (RLC) protocol data unit (PDU) size and flexible RLC PDU creation for multi carrier operation are disclosed. An example wireless transmit/receive unit (WTRU) calculates a maximum amount of data allowed to be transmitted for a current transmission time interval (TTI) for each of a plurality of carriers, and selects an RLC PDU data field size such that each RLC PDU to be multiplexed to a medium access control (MAC) PDU matches a minimum of the maximum amount of data calculated for the carriers. The maximum amount of data may, for example, be calculated based on an applicable current grant for each carrier for the current TTI. The RLC PDU may be generated for the later TTI on a condition that an amount of data in outstanding pre-generated RLC PDUs for a particular logical channel is less than or equal to 4N times the minimum of the maximum amount of data allowed to be transmitted by the applicable current grant for the carriers for the current TTI, where N is a number of activated carriers. The maximum amount of data may be calculated based on a remaining power on each carrier.

14 Claims, 4 Drawing Sheets

(51) Int. Cl.
*H04W 28/06* (2009.01)
*H04L 5/00* (2006.01)
*H04W 72/02* (2009.01)
*H04W 88/02* (2009.01)

(56) References Cited

U.S. PATENT DOCUMENTS

| | | |
|---|---|---|
| 2008/0225891 A1 | 9/2008 | Cave et al. |
| 2009/0059929 A1 | 3/2009 | Lee |
| 2010/0002697 A1 | 1/2010 | Krishnan et al. |
| 2011/0090806 A1 | 4/2011 | Ozturk et al. |
| 2011/0223904 A1 | 9/2011 | Fan et al. |

FOREIGN PATENT DOCUMENTS

| | | |
|---|---|---|
| JP | 2008-539668 A | 11/2008 |
| JP | 2010-541410 A | 12/2010 |
| JP | 2010-541416 A | 12/2010 |
| JP | 2010-541424 A | 12/2010 |
| JP | 2012-523800 A | 10/2012 |
| TW | 2009/01689 A | 1/2009 |
| WO | WO 2006/113829 A2 | 10/2006 |
| WO | WO 2006/118831 A2 | 11/2006 |
| WO | WO 2008-154624 A2 | 12/2008 |
| WO | WO 2009/045882 | 4/2009 |
| WO | WO 2009/045892 A2 | 4/2009 |
| WO | WO 2009/045913 A2 | 4/2009 |
| WO | WO 2010/120732 A2 | 10/2010 |

OTHER PUBLICATIONS

3rd Generation Partnership Project (3GPP). R2-097440, "Partial Radio Awareness for DC-HSUPA capable Ues," Samsung et al., 3 GPP TSG RAN WG2 #68, Nov. 9-13, 2009.
3rd Generation Partnership Project (3GPP), TS 25.322 V3.18.0, 3rd Generation Partnership Project; Technical Specification Group Radio Access Network; Radio Link Control (RLC) Protocol Specification (Release 1999), Jun. 2004.
3rd Generation Partnership Project (3GPP), TS 25.322 V4.12.0, 3rd Generation Partnership Project; Technical Specification Group Radio Access Network; Radio Link Control (RLC) Protocol Specification (Release 4), Jun. 2004.
3rd Generation Partnership Project (3GPP), TS 25.322 V5.13.0, 3rd Generation Partnership Project; Technical Specification Group Radio Access Network; Radio Link Control (RLC) Protocol Specification (Release 5), Dec. 2005.
3rd Generation Partnership Project (3GPP), TS 25.322 V9.0.0, 3rd Generation Partnership Project; Technical Specification Group Radio Access Network; Radio Link Control (RLC) Protocol Specification (Release 9), Dec. 2009.
3rd Generation Partnership Project (3GPP), TS 25.322 V7.10.0, 3rd Generation Partnership Project; Technical Specification Group Radio Access Network; Radio Link Control (RLC) Protocol Specification (Release 4), Jun. 2009.
3rd Generation Partnership Project (3GPP), TS 25.322 V7.9.0, 3rd Generation Partnership Project; Technical Specification Group Radio Access Network; Radio Link Control (RLC) Protocol Specification (Release 7), Mar. 2009.
3rd Generation Partnership Project (3GPP), TS 25.322 V6.12.0, 3rd Generation Partnership Project; Technical Specification Group Radio Access Network; Radio Link Control (RLC) Protocol Specification (Release 6), May 2008.
European Telecommunications Standards Institute (ETSI), TS 125 322, V8.4.0, "Universal Mobile Telecommunications System (UMTS); Radio Link Control (RLC) protocol specification (3GPP TS 125 322 Release 8.4.0 Release 8)", Apr. 2009.
European Telecommunications Standards Institute (ETSI), TS 125 322, V8.7.0, "Universal Mobile Telecommunications System (UMTS); Radio Link Control (RLC) protocol specification (3GPP TS 125 322 version 8.4.0 Release 8)", Feb. 2010.
3rd Generation Partnership Project (3GPP), R1-082614, "Independent schedule scheme on Dual Cell HSDPA Operation", HUAWEI, 3GPP TSG RAN WG1 #53bis, Jun. 30-Jul. 30, Warsaw, Poland, 5pages.

METHOD AND APPARATUS FOR GENERATING A RADIO LINK CONTROL PROTOCOL DATA UNIT FOR MULTI-CARRIER OPERATION

CROSS REFERENCE TO RELATED APPLICATION

This application is a continuation of U.S. patent application Ser. No. 12/765,310, filed Apr. 22, 2010, which claims the benefit of U.S. provisional application. No. 61/172,499 filed Apr. 24, 2009, which is incorporated by reference as if fully set forth.

FIELD OF INVENTION

This application is related to wireless communications.

BACKGROUND

A radio link control (RLC) entity in a wireless transmit/receive unit (WTRU) and UMTS terrestrial radio access network (UTRAN) may operate in a transparent mode (TM), an unacknowledged mode (UM), or an acknowledged mode (AM). An UM RLC entity and a TM RLC entity may be configured to be a transmitting RLC entity or a receiving RLC entity. The transmitting RLC entity transmits RLC protocol data units (PDUs) and the receiving RLC entity receives RLC PDUs. An AM RLC entity comprises a transmitting side and a receiving side. The transmitting side of the AM RLC entity transmits RLC PDUs and the receiving side of the AM RLC entity receives RLC PDUs.

FIGS. 1A and 1B show conventional UM and AM RLC PDU formats, respectively. The Sequence Number fields indicate the sequence number of the RLC PDU. The Length Indicator fields are used to indicate the last octet of each RLC service data unit (SDU) ending within the RLC PDU. RLC SDUs or segments of RLC SDUs are mapped to the Data field.

Conventionally, an AM RLC entity may generate RLC PDUs of a fixed size in the uplink (UL) that is configured by the network via radio resource control (RRC) signalling. Similarly, an UM RLC entity may choose the RLC PDU size from a limited configured set of sizes.

In the Third Generation Partnership Project (3GPP) Release 7, the RLC protocol has been extended to support flexible RLC PDU sizes in the down link (DL), but not in the UL. In 3GPP Release 8, the flexible RLC, PDUs are allowed in the UL as well so that the AM and UM RLC entities are allowed to create RLC PDUs of a flexible size in the UL.

The network may configure an uplink radio bearer in a wireless transmit/receive unit (WTRU) to generate RLC PDUs of a flexible size within a minimum and maximum RLC PDU size, which are configured by the RRC layer. More specifically, the WTRU may segment and/or concatenate uplink RLC SDUs to create RLC PDUs larger than or equal to a minimum UL RLC PDU size and smaller than or equal to a maximum UL RLC PDU size. If data to be transmitted is not large enough to create an RLC PDU of the minimum UL RLC PDU size, the RLC entity may create an AM PDU smaller than the minimum UL RLC PDU size. This removes the need for padding in a case where the amount of available data is lower than the minimum UL RLC PDU size.

For maximum transmission efficiency, the size of the RLC PDU should match the number of bits that will, be allowed to be sent over the air interface in the current transmission time interval (TTI) for a given logical channel. This increases transmission efficiency and greatly reduces layer 2 (L2) header overhead.

Under the current 3GPP specification, the RLC entity may create RLC PDUs at a given transmission opportunity based on the number of bits requested for the given logical channel from the medium access control (MAC) entity. The RLC entity selects the size of the data field of the RLC PDU to match the data requested for a particular logical channel by the MAC entity. With this option, the RLC entity needs to wait until the transmission opportunity to get the information from the MAC entity and, therefore, some latency issue may occur.

Alternatively, the RLC entity may create more RLC. PDUs than what may be transmitted at the upcoming TTI. This option relaxes the processing requirements since this effectively creates a delay between the creation of an RLC PDU and its inclusion in a MAC PDU. The size of the RLC PDU is based on number of bits allowed to be transmitted according to the current grant, scheduled or non-scheduled.

In order to further improve the wireless system throughput, multi-carrier operation is being considered in 3GPP. In multi-carrier operation, the WTRU and the Node-B may transmit and receive via multiple carriers.

The flexible RLC PDU creation currently handles the case where RLC PDUs are transmitted via a single carrier. The inventors have recognized that, with multi-carrier operation, a WTRU will have the option to transmit more than one MAC PDU in a given TTI via multiple carriers. Since the channel conditions, available power, and grant may not be the same over the carriers, techniques for flexible PLC PDU creation for multi-carriers are required.

SUMMARY

Apparatus and methods for efficiently determining the RLC PDU size and flexible RLC PDU creation for multi carrier operation are disclosed. In one embodiment, a WTRU is configured to calculate a maximum amount of data allowed to be transmitted for a current TTI for each of a plurality of carriers, and to select an RLC PDU data field size such that each RLC PDU to be multiplexed to an MAC PDU matches a minimum of the maximum amount of data calculated for the carriers. The maximum amount of data may be calculated, for example, based on an applicable current grant for each carrier for the current TTI. The RLC PDU may be generated for a later TTI on a condition that an amount of data in outstanding pre-generated RLC PDUs for a particular logical channel is less than or equal to 4N times a minimum of a maximum amount of data allowed to be transmitted by the applicable current grant for the carriers for the current TTI, where N is the number of activated carriers. The maximum amount of data may be calculated based on a maximum remaining power on each carrier.

BRIEF DESCRIPTION OF THE DRAWINGS

A more detailed understanding may be had from the following description, given by way of example in conjunction with the accompanying drawings.

DETAILED DESCRIPTION

When referred to hereafter, the terminology "WTRU" includes but is not limited to a user equipment WE), a mobile station, a fixed or mobile subscriber unit, a pager, a cellular telephone, a personal digital assistant (PDA), a computer, a sensor, a machine-to-machine (M2M) device, or any other type of device capable of operating in a wireless environment. When referred to hereafter, the terminology "base station" includes but is not limited to a Node-B, a site controller, an access point (AP), or any other type of interfacing device capable of operating in a wireless environment. When referred to hereafter, the terminologies "carrier" and "frequency" will be used interchangeably and it should be noted that different systems may use different terminologies, such as "component carrier" in 3GPP long term evolution (LTE).

Even though the embodiments are disclosed with reference to control channels and data channels associated to 3GPP high speed packet access (HSPA), it should be noted that the embodiments are not limited to 3GPP HSPA, but applicable to any wireless communication technologies that are currently existing or will be developed in the future including, but not limited to, 3GPP LTE, LTE advanced, cdma2000, IEEE 802.xx, etc. The embodiments described herein may be applicable in any order or combinations.

Figure 1A:
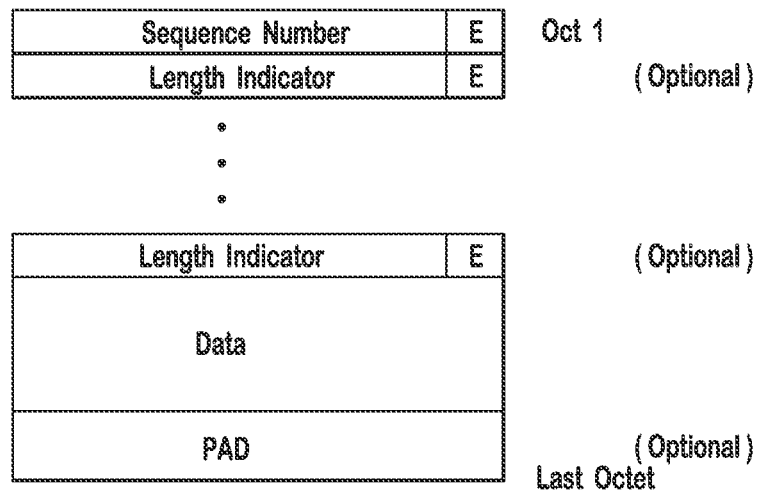
FIGS. 1A and 1B are format diagrams that show conventional UM and AM RLC PDU formats, respectively.
Figure 1B:
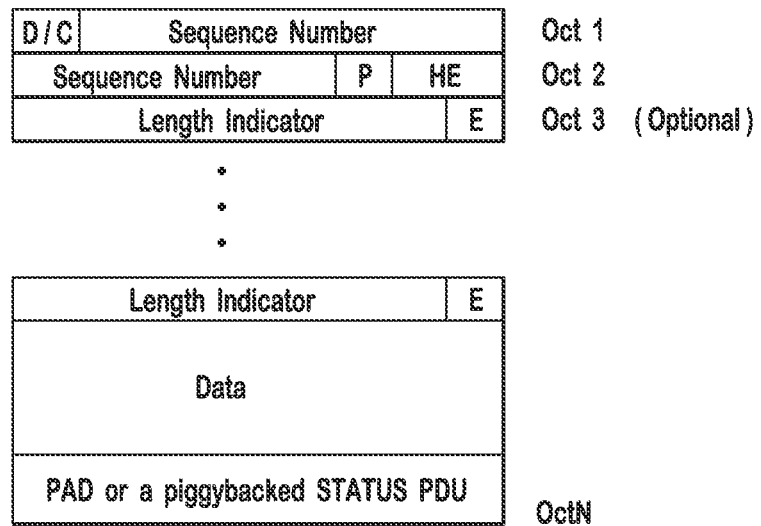
Figure 2:
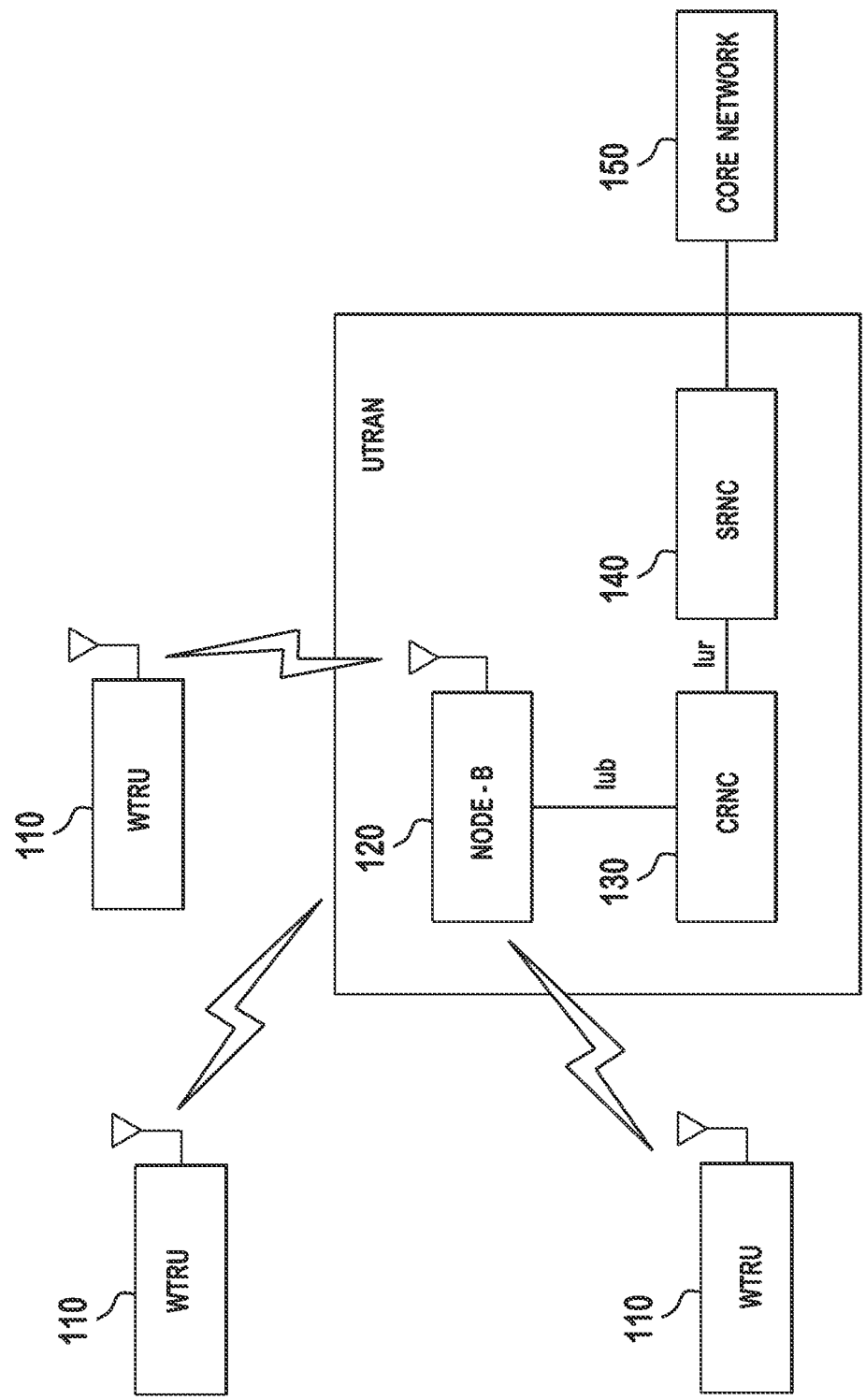
FIG. 2 is a block diagram that shows a wireless communication system including a plurality of WTRUs, a Node B, a controlling radio network controller (CRNC), a serving radio network controller (SRNC), and a core network.

With reference to FIG. 2, an example wireless communication system 100 includes a plurality of WTRUs 110, a Node B 120, a controlling radio network controller (CRNC) 130, a serving radio network controller (SRNC) 140, and a core network 150. The Node B 120 and the CRNC 130 may collectively be referred to as the universal terrestrial radio access network (UTRAN).

As shown in FIG. 2, the WTRUs 110 are in communication with the Node B 120, which is in communication via an Iub iterface with the CRNC 130 and the SRNC 140, the CRNC 130 and the SRNC 140 being connected via an Iur iterface. Although three WTRUs 110, one Node B 120, one CRNC 130, and one SRNC 140 are shown in FIG. 2, any combination of wireless and wired devices may be included in the wireless communication system 100.

Figure 3:
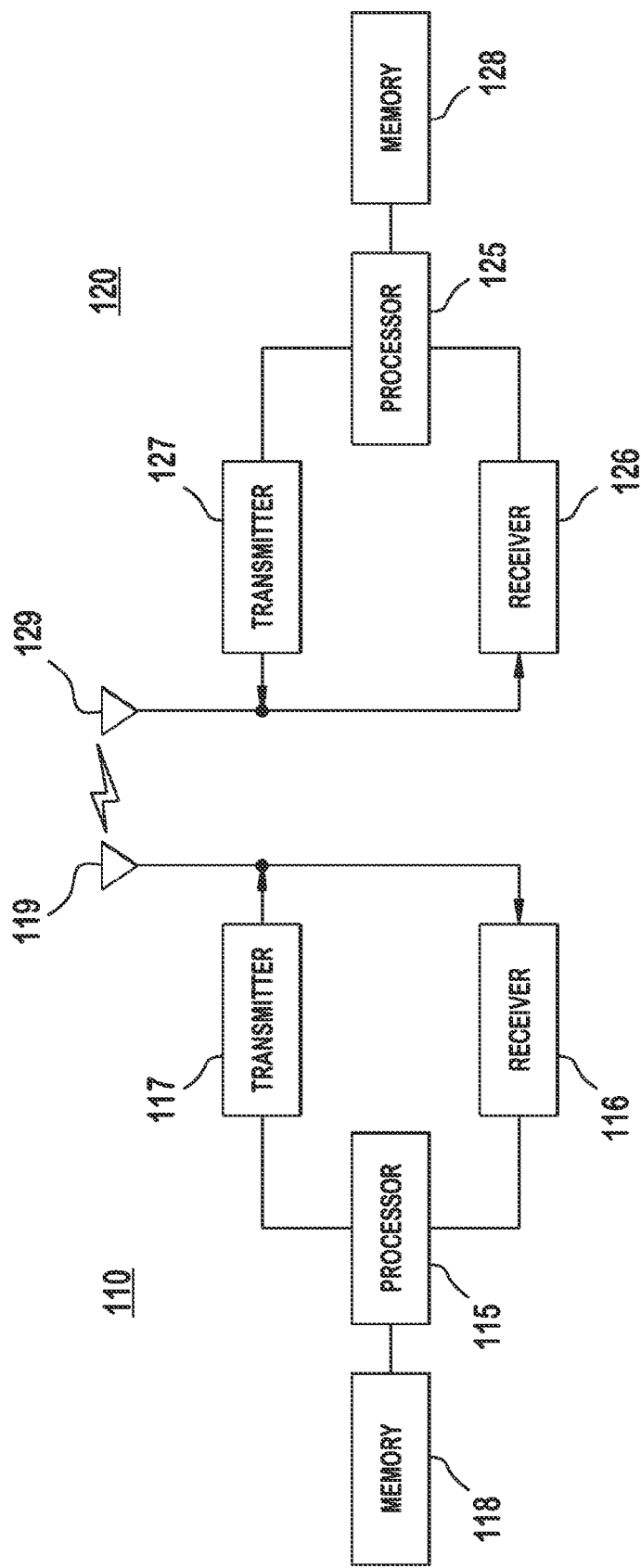
FIG. 3 is a functional block diagram of a WTRU and the Node B of the wireless communication system of FIG. 2.

FIG. 3 is a functional block diagram of a WTRU 110 and the Node B 120 of the wireless communication system 100 of FIG. 2. As shown in FIG. 3, the WTRU 110 is in communication with the Node B 120 and both are configured to determine the RLC PDU size and generate an RLC PDU for multi carrier operation in accordance with any one of embodiments.

In addition to the components that may be found in a typical WTRU, the example WTRU 110 includes a processor 115, a receiver 116, a transmitter 117, a memory 118, and an antenna 119. The WTRU 110 (i.e., the processor 115, the receiver 116, and the transmitter 117), is configured to transmit and/or receive via multiple carriers on the uplink and/or the downlink. The memory 118 is provided to store software including operating system, application, etc. The processor 115 may be configured to perform, alone or in association with software, the RLC PDU size determination and an RLC PDU generation for multi carrier operation in accordance with any one of embodiments. The receiver 116 and the transmitter 117 are in communication with the processor 115. The antenna 119 is in communication with both the receiver 116 and the transmitter 117 to facilitate the transmission and reception of wireless data.

In addition to the components that may be found in a typical Node-B, the example Node B 120 includes a processor 125, a receiver 126, a transmitter 127, a memory 128, and an antenna 129. The Node B 120, (i.e., the processor 125, the receiver 126, and the transmitter 127), is configured to transmit and/or receive via multiple carriers on the downlink and/or the uplink. The processor 125 may be configured to determine the RLC PDU size and generate an RLC PDU for multi carrier operation in accordance with any one of embodiments. The receiver 126 and the transmitter 127 are in communication with the processor 125. The antenna 129 is in communication with both the receiver 126 and the transmitter 127 to facilitate the transmission and reception of wireless data.

In accordance with one embodiment, a WTRU, (i.e., RLC entity of the WTRU), may be configured to choose one RLC PDU size, (equivalently RLC PDU data field size when taking into account header(s)), for all activated carriers and pre-generate RLC PDUs for a current and/or later TTI on a condition that the WTRU has data available for transmission.

The WTRU may be configured to choose the size of the data field of the RLC PDU such that each RLC PDU to be multiplexed to a MAC PDU (e.g., MAC-i PDU), for any of the carriers matches a maximum amount of data allowed to be transmitted given by a minimum of applicable current grants across the carriers. For example, in the case where two carriers, a primary carrier and a secondary carrier) are activated, the size of the data field of the RLC PDU may be chosen so that each RLC PDU to be multiplexed to the MAC PDU, MAC-i PDU), matches the minimum of:

a maximum amount of data allowed to be transmitted by an applicable current grant on the primary uplink frequency for the current TTI and a maximum amount of data allowed to be transmitted by the applicable current grant on the secondary uplink frequency for the current TTI.

A grant, (i.e., a grant for enhanced dedicated channel (E-DCH) transmissions), may be configured for each carrier. The grant may be a scheduled grant and/or a non-scheduled grant. For the scheduled grant, the WTRU maintains a serving grant that it updates based on information received from the network. The serving grant directly specifies the maximum power the WTRU may use on the E-DCH dedicated physical data channel (E-DPDCH) in the corresponding TTI. The serving grant is updated by an E-DCH absolute grant channel (E-AGCH) and a E-DCH relative grant channel (E-RGCH). The network also provides the WTRU with the non-scheduled grant to configure the maximum block size that the WTRU may transmit on the E-DCH during a TTI.

The "applicable grant" corresponds to either the scheduled grant or the non-scheduled grant depending on the logical channel. If the logical channel belongs to a scheduled MAC-d flow, the applicable grant for the logical channel corresponds to a serving grant (i.e., scheduled grant). If the logical channel belongs to a non-scheduled MAC-d flow, the applicable grant for the logical channel corresponds to the non-scheduled grant configured for the corresponding MAC-d flow.

For dual carrier operation, non-scheduled flows may be allowed, on the primary uplink frequency and may not be allowed on the secondary uplink frequency. In this case, if the logical channel belongs to a non-scheduled. MAC-d flow, then the RLC PDU data field size may be determined such that each RLC PDU to be multiplexed in the MAC PDU, (i.e., MAC-i PLAT), matches the amount of data allowed to be transmitted by the non-scheduled grant for the corresponding MAC-d flow. Therefore, if the non-scheduled flows are not allowed in the secondary frequency, the RLC PDU data field size may be chosen such that it matches the minimum of:

the maximum amount of data allowed to be transmitted by the applicable current grant (scheduled or non-scheduled) on the primary uplink frequency for the current TTI and the maximum amount of data allowed to be transmitted by the applicable current grant on the secondary uplink frequency (scheduled) for the current TTI.

Therefore, if the WTRU is not allowed to transmit non-scheduled data on the secondary uplink frequency, the RLC PDU size for the logical channel belonging to the non-scheduled MAC-d flow is determined based on the applicable grant for the primary uplink frequency.

When determining the RLC PDU size or the size of the data field of the RLC PDU, the size of the RLC PDU may not exceed the configured maximum RLC PDU size, and may not be lower than the configured minimum RLC PDU size unless there is not enough data available in the buffer.

For a single carrier operation, RLC PDUs may, for example, be pre-generated if the amount of data in outstanding pre-generated RLC PDUs for a particular logical channel is less than or equal to four (4) times the maximum amount of data allowed to be transmitted by the applicable current grant (scheduled or non-scheduled) for the current TTI. In accordance with one embodiment, for a multi-carrier operation, the WTRU may be configured to pre-generate RLC PDUs on a condition that the amount of data in outstanding pre-generated RLC PDUs for a particular logical channel is less than or equal to 4×N times the minimum of the maximum amount of data allowed to be transmitted by the applicable current grants for the carriers for the current TTI, where N is the number of activated carriers. For example, in dual carrier operation, N corresponds to 2, therefore the WTRU is allowed to pre-generate RLC PDU(s) if the amount of data in outstanding pre-generated RLC PDUs for the logical channel is less than or equal to 8 (i.e., 4×2) times the minimum of the maximum amount of data allowed to be transmitted by the applicable current grants across the carriers for the current TTI. For other examples, instead of 4N, any integer multiple of the number of configured carriers may be configured.

Figure 4:
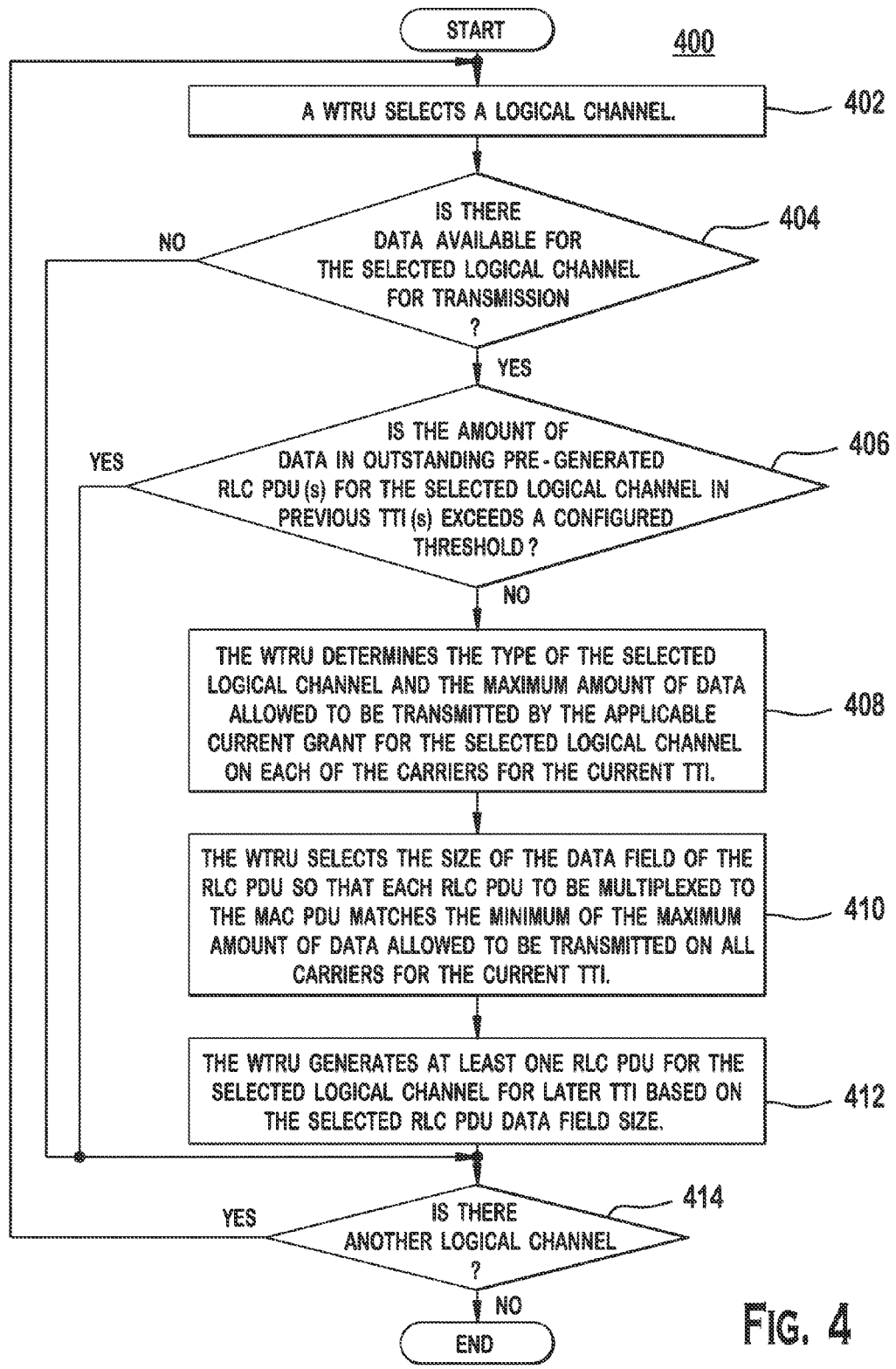
FIG. 4 is a flow diagram of an example process for generating an RLC PDU in accordance with one embodiment.

FIG. 4 is a flow diagram of an example process 400 for generating an RLC PDU in accordance with one embodiment. A WTRU, (i.e., RLC entity of the WTRU), selects a logical channel (step 402). The logical channel may, for example, be selected according to the E-DCH transport format combination (E-TFC) selection rule. The WTRU may be configured to determine whether there is data available for transmission for the selected logical channel (step 404). Optionally, this may be a determination of a sufficient amount of data over a threshold. The WTRU may be configured to also optionally determine whether RLC PDU pre-generation is allowed for the selected logical channel. If there is no data available and/or optionally if RLC PDU pre-generation is not allowed for the logical channel, it is then determined whether there is another logical channel for processing (step 414). In such case, the process 400 either branches back to step 402 for another logical channel selection or ends based on the determination in step 414.

If there is data available for the logical channel (and optionally RLC PDU pre-generation is allowed for the selected logical channel), the WTRU in this example determines whether or not the amount data in outstanding pre-generated RLC PDU(s) for the selected logical channel in previous TTI(s) exceeds a configured threshold (step 406). The configured threshold may, for example, be 4×N times the minimum of the maximum amount of data allowed to be transmitted by the applicable current grants for the carriers for the current TTI, where N is the number of activated carriers. If the configured threshold is exceeded, the WTRU in this example does not allowed pre-generation of more RLC PDUs for the logical channel, and the process 400 branches to step 414 to determine whether there is another logical channel. If the configured threshold is not exceeded, the WTRU is allowed to pre-generate RLC PDU(s) for the logical channel. Alternatively, the WTRU may be configured to not check if it is allowed to pre-generate RLC PDUs (i.e. step 406 may be skipped), but may continue directly with the remaining steps (408, 410, 412) to determine the RLC PDU size and how many RLC PDUs it may create. In the case where RLC PDUs cannot be pre-generated, then the number of RLC PDUs the WTRU may pre-generate will be equivalent to one.

In pre-generating the RLC PDU(s), the WTRU in this example determines the type of the logical channel, (i.e., scheduled or non-scheduled), and determines the maximum amount of data allowed to be transmitted by the applicable current grant on each of the carriers for the current TTI (step 408). If the logical channel belongs to the scheduled MAC flow, the applicable grant is the serving grant and if the logical channel belongs to the non-scheduled MAC flow, the applicable grant is a non-scheduled grant configured for the corresponding MAC-d flow. Alternatively or additionally, the maximum amount of data may be calculated based on power (maximum remaining power, WTRU power headroom, or the like) on each carrier, as explained in detail below.

The WTRU in this example selects the size of the data field of the RLC PDU, (equivalently the size of the RLC PDU), so that each RLC PDU to be multiplexed to the MAC PDU (e.g., MAC-i PDU) matches the minimum of the maximum amount of data allowed to be transmitted among the activated carriers for the current TTI (scheduled or non-scheduled) (step 410).

The WTRU generates at least one RLC PDU for the selected logical channel for later TTI based on the selected RLC PDU data field size (e.g., $X_{RLC\ PDU\ size}$) (step 412). The WTRU in one example determines the amount of data, (i.e., the number of RLC PDUs), to pre-generate for the logical channel as follows. The amount of RLC PDU(s) pre-generated in previous TTIs is referred to $K_{pre-generated}$. The maximum amount of data allowed to pre-generate if no RLC PDU has already been pre-generated ($K_{max, allowed\ data}$) may be determined by $4 \times N \times X_{RLC\ PDU\ size}$, where N is the number of activated carriers, and $X_{RLC\ PDU\ size}$ the minimum of the maximum amount of data allowed to be transmitted by the applicable current grant (scheduled or non-scheduled) on all carriers for the current TU. Alternatively, $X_{RLC\ PDU\ size}$ may correspond to the RLC PDU size the WTRU can create as determined according to any of the embodiments described herein.

The WTRU may be configured to pre-generate RLC PDUs for the logical channel up to the remaining available space ($K_{remaining\ allowed}$), which is calculated as follows:

$$K_{remaining\ allowed} = \min(K_{available\ data}, (K_{max, allowed\ data} - K_{pre-generated})),\quad \text{Equation (1)}$$

where $K_{available\ data}$ is the amount of available data for transmission for the logical channel. Optionally, the WTRU may be configured to calculate $K_{remaining\ allowed}$ after taking into account the data that will be transmitted on the current TTI. More specifically, if data can or will be transmitted in the current TTI, the WTRU may be configured to subtract that amount of data from $K_{pre-generated}$. If the RLC PDU creation is performed after the E-TFC selection procedure and MAC-i/is PDU creation has been completed, then $K_{pre-generated}$ contains the remaining number of bits or bytes that have been pre-generated.

The WTRU may be configured to calculate the maximum number of RLC PDUs to be pre-generated ($N_{MAX\ RLC\ PDUs}$) for the logical channel as follows:

$$N_{MAX\ RLC\ PDUs} = \lfloor K_{remaining\ allowed}/X_{RLC\ PDU\ size} \rfloor, \quad \text{Equation (2)}$$

where $\lfloor x \rfloor$ is a floor function that gives the greatest integer less than or equal to x, and $N_{MAX\ RLC\ PDUs}$ is a non-negative integer. This may result in the WTRU under-generating RLC PDUs.

Alternatively, the WTRU may be configured to calculate the maximum number of RLC PDUs to be generated for the logical channel as follows:

$$N_{MAX\ RLC\ PDUs} = \lceil K_{remaining\ allowed}/X_{RLC\ PDU\ size} \rceil, \quad \text{Equation (3)}$$

wherein $\lceil x \rceil$ is a ceiling function which gives the smallest integer greater than or equal to x. This may result in generating slightly more RLC PDUs.

Alternatively, the WTRU may be configured to generate N full RLC PDUs of size $X_{RLC\ PDU\ size}$ where N is equivalent to $\lfloor K_{remaining\ allowed}/X_{RLC\ PDU\ size} \rfloor$, and an additional RLC PDU of size equal to min(minimum RLC PDU size, $\text{mod}(K_{remaining\ allowed}, X_{RLC\ PDU\ size})$).

The WTRU may be configured to pre-generate the RLC PDUs when data becomes available in the RLC entity, regardless of the logical channels which are being multiplexed or are allowed to be transmitted at the given TTI. For example, even if the WTRU is not allowed to transmit scheduled or non-scheduled transmissions in the given TTI, the WTRU may still pre-generate RLC PDUs according to the embodiments described herein.

Alternatively, the WTRU may be configured to pre-generate the RLC PDUs for a particular logical channel when data becomes available in the RLC entity and the WTRU is allowed to transmit the type of data for the logical channel at the given TTI. For example, if data becomes available for a logical channel configured to a non-scheduled MAC-d flow, but the WTRU is not allowed to transmit non-scheduled transmissions at the given TTI, the WTRU may be configured to not pre-generate RLC PDUs. Alternatively, this rule may be applied to scheduled flows. Alternatively, for non-scheduled flows the WTRU may be configured to pre-generate the RLC PDUs after arrival, of data, from a higher layer if the non-scheduled grant for the corresponding MAC-d flow is semi-static.

Alternatively, the WTRU may be configured to pre-generate RLC PDU(s) when data is available and the WTRU is allowed to transmit data on the given TTI for this logical channel according to the multiplexing restriction based on the priority of MAC-d flows.

Alternatively, the WTRU may be configured to pre-generate RLC PDU(s) when data is available and the WTRU has been able to multiplex data on the given TTI (e.g., data will be transmitted on this TTI from this logical channel).

In the embodiment above, the WTRU may be configured to select the size of the data field of the RLC PDU, (i.e., equivalently the size of the RLC PDU), so that each RLC PDU to be multiplexed to the MAC PDU (e.g., MAC-i PDU) matches the minimum of the maximum amount of data allowed to be transmitted on all carriers for the current TTI (scheduled or non-scheduled).

Alternatively, the WTRU may be configured to choose the size of the data field of the RLC PDU such that each RLC PDU to be multiplexed to the MAC PDU MAC-i/is PDU), for any of the carriers matches the maximum amount of data allowed to be transmitted given by the maximum of the applicable current grants for the carriers.

Alternatively, the WTRU may be configured to choose the size of the data field of the RLC PDU such that each RLC PDU to be multiplexed to the MAC PDU (e.g., MAC-i/is PDU), for any of the carriers matches the maximum amount of data allowed to be transmitted given by the sum of the applicable current grants for the carriers. In case where the current grants are scheduled grants expressed in terms of the power ratio, the sum may be calculated by first summing the power ratios (in linear units) and then determining the amount of data that may be transmitted with the summed power ratio. Alternatively, the sum may be calculated by first determining the amounts of data that may be transmitted with the individual grants and then summing these amounts of data.

Alternatively, the WTRU may be configured to choose the size of the data field of the RLC PDU such that each RLC PDU to be multiplexed to the MAC PDU (e.g., MAC-i/is PDU), for any of the carriers matches the maximum amount of data allowed to be transmitted given by the average of all applicable grants across all carriers. In case where the current grants are scheduled grants expressed in terms of power ratio, the average may be calculated by first averaging the power ratios linear units) and then determining the amount of data that may be transmitted with the averaged power ratio. Alternatively, the average may be calculated by first determining the amounts of data that may be transmitted with the individual grants and then averaging these amounts of data.

Alternatively, the WTRU may be configured to choose the size of the data field of the RLC PDU such that each RLC PDU to be multiplexed to the MAC PDU (e.g., MAC-i/is PDU), for any of the carriers matches a running average of the maximum amount of data allowed by applicable grants by all carriers for a predetermined number of TTIs or effective number of TTIs in case an infinite impulse response (IIR) filter is used).

In accordance with another embodiment, the WTRU may be configured to create multiple sets of RLC PDUs wherein the data field size of the RLC PDU in each set is chosen to match the maximum amount of data allowed to be transmitted by the applicable grant in each carrier. For example, if the WTRU is configured to communicate over two carriers, the WTRU may be configured to generate two sets of RLC PDUs for the two carriers, wherein the data field size of the RLC PDU in each set is chosen to match the maximum amount of data allowed to be transmitted by the applicable grant in the corresponding carrier.

At any TTI the WTRU may be configured to be limited by power rather than grant. Therefore, the WTRU may be configured to take into account the available power on the carriers optionally in addition to the grants in determination of the size of the data field of the RLC PDU, (i.e., the maximum amount of data allowed to be transmitted for each carrier for the current TTI).

In case where each carrier is configured or allocated a separate maximum power, the WTRU may be configured to calculate, for example, the maximum remaining power allowed for E-DCH transmission on each carrier. The maximum remaining power allowed for E-DCH transmission for each carrier is a power calculated by subtracting a power required for control channels, (i.e., dedicated physical control channel (DPCCH) and high speed dedicated physical control channel. (HS-DPCCH)), from the allocated maximum power for the carrier. The WTRU may be configured to calculate the maximum amount of data that may be transmitted based on both the applicable current grant and the maximum remaining power allowed for E-DCH transmission on each carrier for the current TTI. The WTRU may be configured to then choose the size of the data field of the RLC PDU for RLC PDU pre-generation so that each RLC PDU to be multiplexed to the MAC PDU (e.g., MAC-i/is PDU), matches the minimum of the maximum amount of data on all carriers.

The maximum remaining power allowed for E-DCH transmission may be calculated according to the E-DCH transport format combination (E-TFC) restriction mechanism specified for multi-cell operation. When determining the maximum amount of data that can be transmitted on the given carrier based on the normalized remaining power, the WTRU may be configured to determine the supported E-TFC based on the power offset of the MAC-d flow corresponding to the given logical channel, or alternatively based on the power offset of the higher priority MAC-d flow, or of the highest priority MAC-d flow for the type of flow (e.g., scheduled or non-scheduled). The WTRU may be configured to also take into account a hybrid automatic repeat request (HARQ) offset of the corresponding logical channel.

In case where one maximum power is configured for all carriers to be shared by all carriers, the WTRU may be configured to calculate the maximum remaining power allowed for E-DCH transmission for each carrier based on the ratio of the serving grants on the carriers after pre-allocating a power for non-scheduled transmissions. The WTRU may be configured to assume that the applicable remaining power for each carrier may be used by the respective carrier. Alternatively, the WTRU may be configured to assume that half of the total available remaining power is available for each carrier.

For example, in dual carrier operation, the WTRU may be configured to first pre-allocate power to one (or two) carrier(s) for non-scheduled transmissions and then split the remaining value for scheduled transmissions according to the serving grant ratio, (i.e., the ratio of serving grants on the carriers). For example, if non-scheduled transmission is not allowed on the secondary carrier, the maximum remaining power allowed for E-DCH transmission on the primary carrier may be a sum of a power pre-allocated for non-scheduled transmission and a power allocated for scheduled transmission, which is calculated based on a serving grant ratio and a remaining value calculated by subtracting the pre-allocated power for non-scheduled transmission and a power required for control channels, (i.e., DPCCH and HS-DPCCH), from the allocated maximum power for all carriers. The maximum remaining power allowed for E-DCH transmission on the secondary carrier may be a power allocated for scheduled transmission that is calculated based on a serving grant ratio and a remaining value calculated by subtracting the pre-allocated power for non-scheduled transmission and a power required for control channels, (i.e., DPCCH and HS-DPCCH), from the allocated maximum power for all carriers.

These embodiments are equally applicable to operations with more than two carriers such that the normalized remaining power for each carrier will determine the maximum allowed data that can be transmitted on that carrier based on power.

The WTRU may be configured to determine the maximum amount of data it can transmit based on power and grant for each carrier, $K_{maxdata,x}$, where x corresponds to carrier number. For example, for each carrier, the maximum amount of data based on the power allocated and E-TFC restriction for that carrier and the maximum amount of data based on the serving grant for that carrier are determined, and $K_{maxdata,x}$ for that carrier is the minimum of these two. The WTRU may be configured to determine the data field size of the RLC PDU for RLC PDU pre-generation as the minimum value of $K_{maxdata,x}$ amongst all carriers. For example, if two carriers are activated (x=1, 2), the RLC PDU size, (e.g., $X_{RLC\ PDU\ size}$), for RLC PDU pre-generation may be determined as the minimum of $K_{maxdata,1}$ and $K_{maxdata,2}$. As previously mentioned the maximum and minimum configured RLC PDU values may also be taken into account.

The power offset or the HARQ profile used to calculate the number of bits may be determined according to the one of the embodiments described above.

In accordance with another embodiment, the WTRU may be configured to determine the maximum amount of data allowed to be transmitted by the applicable current grant on all carriers for the current TTI, (i.e., based on the minimum (or maximum, sum, or average) of the applicable grants on all carriers). The WTRU then determines the maximum amount of data allowed to be transmitted by the remaining power on all carriers for the current TTI. The WTRU then determines the size of the data field of the RLC PDU that need to be pre-generated for a later TTI to be the minimum of the maximum amount of data calculated based on the applicable grants on all carriers and the maximum amount of data calculated based on the remaining power on all carriers.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be configured to be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for generating a radio link control (RLC) protocol data unit (PDU) for multi-carrier operation, the method comprising:

determining whether there is data available for transmission;

on a condition that there is data available for transmission, for each of a plurality of carriers, calculating a maximum amount of data allowed to be transmitted by a current grant for a current transmission time interval (TTI);

choosing a size of a data field of the RLC PDU such that each RLC PDU to be multiplexed to a medium access control (MAC) PDU matches a minimum of the maximum amount of data calculated for each of the plurality of carriers; and generating at least one RLC PDU for a later TTI based on the chosen size of the data field of the RLC PDU.

2. The method of claim 1, wherein the maximum amount of data allowed to be transmitted for the current TTI on each carrier is calculated based on an applicable current grant for each carrier for the current TTI.

3. The method of claim 2, wherein the RLC PDU is pre-generated on a condition that an amount of data in outstanding pre-generated RLC PDUs for a logical channel is less than or equal to a factor multiplied by N times the minimum of the maximum amount of data allowed to be transmitted for the current TTI by the applicable current grant for the plurality of carriers for the current TTI, where N is a number of activated carriers.

4. The method of claim 2, wherein the applicable current grant is a scheduled current grant or a non-scheduled current grant.

5. The method of claim 1, wherein a first carrier is a primary carrier and a second carrier is a secondary carrier, and a non-scheduled MAC flow is allowed on the primary carrier and a scheduled MAC flow is allowed on both the primary carrier and the secondary carrier, and the size of the data field of the RLC PDU is selected so that each RLC PDU to be multiplexed to the MAC PDU matches a minimum of:

a maximum amount of data allowed to be transmitted by an applicable current scheduled or non-scheduled grant on the primary carrier for the current TTI and a maximum amount of data allowed to be transmitted by an applicable current scheduled grant on the secondary carrier for the current TTI.

6. A wireless transmit/receive unit (WTRU) for generating a radio link control (RLC) protocol data unit (PDU) in a flexible size for multi-carrier transmission, the WTRU comprising:

a processor configured to:

determine whether there is data available for transmission;

on a condition that there is data available for transmission, for each of a plurality of carriers, calculate a maximum amount of data allowed to be transmitted by a current grant for a current transmission time interval (TTI);

choose a size of a data field of the RLC PDU such that each RLC PDU to be multiplexed to a medium access control (MAC) PDU matches a minimum of the maximum amount of data calculated for each of the plurality of carriers; and generate at least one RLC PDU for a later TTI based on the chosen size of the data field of the RLC PDU.

7. The WTRU of claim 6, wherein the maximum amount of data allowed to be transmitted for the current TTI on each carrier is calculated based on an applicable current grant for each carrier for the current TTI.

8. The WTRU of claim 7, wherein the RLC PDU is pre-generated on a condition that an amount of data in outstanding pre-generated RLC PDUs for a logical channel is less than or equal to a factor multiplied by N times the minimum of the maximum amount of data allowed to be transmitted for the current TTI by the applicable current grant for the plurality of carriers for the current TTI, where N is a number of activated carriers.

9. The WTRU of claim 7, wherein the applicable current grant is a scheduled current grant or a non-scheduled current grant.

10. The WTRU of claim 6, wherein a first carrier is a primary carrier and a second carrier is a secondary carrier, and a non-scheduled MAC flow is allowed on the primary carrier and a scheduled MAC flow is allowed on both the primary carrier and the secondary carrier, and the size of the data field of the RLC PDU is selected so that each RLC PDU to be multiplexed to the MAC PDU matches a minimum of:

a maximum amount of data allowed to be transmitted by an applicable current scheduled or non-scheduled grant on the primary carrier for the current TTI and a maximum amount of data allowed to be transmitted by an applicable current scheduled grant on the secondary carrier for the current TTI.

11. The method of claim 1, wherein the MAC PDU is a MAC-i PDU.

12. The method of claim 1, wherein the plurality of carriers are uplink carriers and wherein the uplink carriers comprise a primary uplink frequency and a secondary uplink frequency.

13. The WTRU of claim 6, wherein the MAC PDU is a MAC-i PDU.

14. The WTRU of claim 6, wherein the plurality of carriers are uplink carriers and wherein the uplink carriers comprise a primary uplink frequency and a secondary uplink frequency.

* * * * *